United States Patent
Kuenzel

(10) Patent No.: US 11,788,632 B2
(45) Date of Patent: Oct. 17, 2023

(54) EXPANSION VALVE HAVING A SEALING RING HOLDER FOR SIMPLIFIED ASSEMBLY

(71) Applicant: Robert Bosch GmbH, Stuttgart (DE)

(72) Inventor: Gerald Kuenzel, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/760,645

(22) PCT Filed: Sep. 10, 2020

(86) PCT No.: PCT/EP2020/075277
§ 371 (c)(1),
(2) Date: Mar. 15, 2022

(87) PCT Pub. No.: WO2021/052849
PCT Pub. Date: Mar. 25, 2021

(65) Prior Publication Data
US 2022/0333697 A1    Oct. 20, 2022

(30) Foreign Application Priority Data
Sep. 20, 2019  (DE) .................... 10 2019 214 335.0
Sep. 9, 2020   (DE) .................... 10 2020 211 278.9

(51) Int. Cl.
*F16K 5/06*      (2006.01)
*F25B 41/35*     (2021.01)
(Continued)

(52) U.S. Cl.
CPC .......... *F16K 5/0689* (2013.01); *F16K 5/0636* (2013.01); *F16K 5/08* (2013.01); *F16K 27/067* (2013.01); *F25B 41/35* (2021.01)

(58) Field of Classification Search
CPC ........ F16K 5/0689; F16K 5/0636; F16K 5/08; F16K 27/067; F25B 41/35
(Continued)

(56) References Cited

U.S. PATENT DOCUMENTS 1,378,026 A    5/1921  Hansen
3,095,898 A *  7/1963  Freeman ............... F16K 5/0673
                                              137/454.2
(Continued)

FOREIGN PATENT DOCUMENTS

WO    03091816 A2    11/2003

OTHER PUBLICATIONS

Translation of International Search Report for Application No. PCT/EP2020/075277 dated Dec. 15, 2020 (2 pages).

*Primary Examiner* — John Bastianelli
(74) *Attorney, Agent, or Firm* — Michael Best & Friedrich LLP

(57) ABSTRACT

The invention relates to a valve, in particular an expansion valve, for controlling a fluid flow, having a valve housing with an accommodation space and at least two fluid ducts connected to the accommodation space, having an opening which runs perpendicularly to the fluid ducts and opens into the accommodation space, wherein a sealing ring holder with a valve means is situated in the accommodation space, wherein the sealing ring holder with the valve means held therein can be inserted into the accommodation space through the opening, and wherein the valve means is positioned rotatably in the sealing ring holder by means of at least two sealing rings. The invention also relates to a sealing ring holder.

16 Claims, 3 Drawing Sheets

(51) Int. Cl.
*F16K 27/06* (2006.01)
*F16K 5/08* (2006.01)

(58) Field of Classification Search
USPC .................................................. 251/309–317
See application file for complete search history.

(56) References Cited

U.S. PATENT DOCUMENTS

| | | | | |
|---|---|---|---|---|
| 3,107,080 A * | 10/1963 | Priese | ................ | F16K 31/1635 92/72 |
| 3,150,681 A * | 9/1964 | Hansen | ................... | F16K 5/202 137/454.2 |
| 3,211,421 A * | 10/1965 | Johnson, Jr. | .......... | F16K 5/0678 251/315.08 |
| 3,236,495 A * | 2/1966 | Buchholz | .............. | F16K 5/0689 137/454.6 |
| 3,425,661 A * | 2/1969 | Mayo | ........................ | F16K 5/14 251/283 |
| 3,454,035 A | 7/1969 | Jespersen | | |
| 3,561,727 A * | 2/1971 | Scaramucci | .......... | F16K 5/0673 251/328 |
| 3,814,381 A * | 6/1974 | Yopp | ........................ | F16K 5/202 251/315.12 |
| 4,441,524 A * | 4/1984 | Mese | .................... | F16K 5/0689 251/315.12 |
| 4,562,860 A * | 1/1986 | Walter | .................. | F16K 5/0636 251/315.08 |
| 4,796,858 A * | 1/1989 | Kabel | ..................... | F16K 5/182 277/382 |
| 2006/0027779 A1* | 2/2006 | McGuire | ............... | F16K 5/0478 137/15.17 |
| 2018/0023711 A1* | 1/2018 | Hawa | ................... | F16K 5/0636 137/15.22 |

* cited by examiner

EXPANSION VALVE HAVING A SEALING RING HOLDER FOR SIMPLIFIED ASSEMBLY

BACKGROUND OF THE INVENTION

The invention relates to a valve, in particular an expansion valve, for controlling a fluid flow, having a valve housing and a valve means. The invention further relates to a sealing ring holder for such a valve.

Valves are used in different technical fields. For example, expansion valves which expand a coolant and thus are able to generate cooling are used in air conditioning units. Similarly, valves are required for compressing the coolant.

In particular, in the automobile field a plurality of different valves are required for the construction of the air conditioning unit. In electrically driven vehicles, the coolant of the air conditioning unit may be used for cooling further components, such as for example the power electronics, the traction battery and the electric motors.

In the case of an increasing number of components to be cooled, the number of valves required rises in order to permit a use of the coolant which is as energy-efficient and targeted as possible. As a result, many different valves are required, such as for example compression valves and expansion valves, whereby the number of different components and thus also the production costs of such a cooling system rise.

SUMMARY OF THE INVENTION

The object of the invention may be seen as proposing a valve which may be produced in an inexpensive manner and which may be universally used.

This object is achieved by means of the respective subject of the independent claims. Advantageous embodiments of the invention form the subject of the dependent subclaims in each case.

According to one aspect of the invention, a valve, in particular an expansion valve, is provided for controlling a fluid flow. The valve has a valve housing, with an accommodation space and at least two fluid ducts connected to the accommodation space. Moreover, the valve housing has an opening which preferably runs perpendicularly to the fluid ducts and opens into the accommodation space. Alternatively, the opening may also run transversely or parallel or slightly obliquely to at least one fluid duct, in particular to the fluid ducts.

According to the invention, a sealing ring holder with a valve means is situated in the accommodation space, wherein the sealing ring holder with the valve means held therein can be inserted into the accommodation space through the opening. The valve means is preferably positioned rotatably in the sealing ring holder by means of at least two sealing rings.

The sealing rings serve as a fluid seal of the valve means and at the same time permit the valve means to slide or rotate along the sealing rings. To this end, the sealing rings may consist of an elastomer, Teflon, graphite or a plastics with a sealing action. Preferably in a state inserted in the accommodation space, a pressure may be exerted on the valve means via the sealing rings in order to increase a sealing action.

The valve means may preferably be of spherical design, wherein the valve means has a spherical shape at least in some regions. The mode of operation of the valve may thus be similar to a ball valve.

The valve may be designed, for example, as an expansion valve. In particular, the valve may serve for conducting, blocking or expanding a fluid designed as coolant. The fluid may be embodied, for example, as an ammonia, a carbon dioxide, an aqueous solution, a hydrocarbon compound, such as R-134a, R1234yf, propane, butane and the like. Preferably, the valve may be used both as an expansion valve and as a compression valve.

An assembly of the valve and the connection of the valve means to a shaft are possible via a common opening. As a result, an additional assembly opening is not required for the assembly of the valve means in the valve housing, whereby the valve housing may be configured to be mechanically more robust and the production may be accelerated. Moreover, the production of the valve is simplified in terms of technology, whereby the valve may be designed to be more cost-efficient. In particular, by means of such an assembly of the valve means, a complex joining process for the correctly oriented introduction of the valve means into the accommodation space of the valve housing may be saved. In this case, additional fastening steps for introducing screws, which merely locate the valve means in the housing, are also dispensed with.

Preferably, the sealing rings are inserted in through-openings of the sealing ring holder which face the fluid ducts. In particular, the sealing rings may receive additional O-rings and position said O-rings such that the O-rings are blocked between the sealing ring holder and the walls of the accommodation space. By means of this arrangement, the valve means is sealed relative to a fluid via the sealing rings. The O-rings act sealingly in an axial manner or in the direction of flow of the fluid through the fluid ducts and thus may seal the sealing rings relative to the walls of the accommodation space. By this arrangement it is also possible to avoid the situation where the O-rings spring out, even in the case of high pressure differences.

The valve may be produced or assembled in a particularly simple manner in terms of technology. To this end, the valve means is inserted into the sealing ring holder. Subsequently, lateral through-openings of the sealing ring holder are provided with sealing rings and O-rings. Preferably, the sealing ring holder is able to block the sealing rings and the O-rings, such that these sealing rings and O-rings may not be inadvertently released. Subsequently, the sealing ring holder may be inserted with the valve means, the sealing rings and the O-rings through the opening into the accommodation space of the valve housing.

In a final step, a shaft guide as a cover may close the opening and connect the valve means to a shaft. The shaft may serve for moving, in particular for rotating, the valve means in order to connect the fluid ducts together in a fluid-conducting manner or to decouple the fluid ducts from one another.

The shaft may be rotated manually or by an electric motor or an actuator. For example, an actuator may be used with a gear mechanism for the accurate adjustment of an angle of rotation of the valve means. An automated valve control and valve regulation may be implemented by means of an actuator.

According to an exemplary embodiment, in each case an O-ring is arranged on the at least two sealing rings and is held in position by the sealing ring holder. In particular, a sealing ring may define an O-ring radially internally and axially. In a state inserted into a through-opening of the sealing ring holder, an annular receiving groove may be formed thereby between a wall of the through-opening and the sealing ring for receiving an O-ring. The respective sealing ring may be sealed relative to the valve housing by the use of an O-ring. In particular, by means of such an arrangement each O-ring is able to seal against fluids in an axially acting manner.

Preferably, the O-ring may consist of a resilient material, such as for example an elastomer, a silicone or a rubber. Due to the resilient material properties of the O-ring, the O-ring may exert a spring force via the sealing ring onto the valve means and thus improve a sealing action of the sealing ring on the valve means. This may be implemented, in particular, by the positioning of the sealing ring holder in the accommodation space of the valve housing.

A particularly optimal sealing action may be achieved between the sealing rings and the valve means by two sealing rings and O-rings arranged on opposing sides of the valve means.

According to a further embodiment, the sealing ring holder is designed in one part or in two parts. In the case of a two-part sealing ring holder, the valve means may be arranged in a particularly simple manner in the sealing ring holder. In the case of a one-part sealing ring holder, the valve means may be inserted into an internal receiving region, for example via an opening. In this case, as an aid, the sealing ring holder may be thermally increased in size by heating and the valve means may be reduced in size by cooling.

Alternatively, the sealing ring holder may be designed to be resilient in some regions, whereby the valve means may be inserted into an internal receiving region of the sealing ring holder by a small application of force.

According to a further exemplary embodiment, parts of the sealing ring holder, which is designed in two parts, are connected by a plug connection, an adhesive connection, a welded connection or by a positive interaction of the parts with walls of the accommodation space for positioning the valve means. In particular, after introducing the valve means into the internal receiving region the parts of the sealing ring holder may be connected together thereby, resulting in the valve means being able to remain fixedly in the sealing ring holder.

In a particularly simple embodiment in terms of technology, the accommodation space in the valve housing may have a shape corresponding to the sealing ring holder. As a result, the two parts of the sealing ring holder may be arranged with the positioned valve means in the accommodation space such that a combined sealing ring holder is formed. In particular, the sealing ring holder is able to remain in an assembled state by means of the walls of the accommodation space.

According to a further embodiment, the sealing ring holder has a cuboidal shape and is designed as a receiving cage for the valve means. Preferably, the accommodation space of the valve housing is also designed to be cuboidal. As a result, the sealing ring holder may be inserted positively into the accommodation space, wherein a securing against a subsequent twisting or an incorrect assembly of the valve is ensured by the cuboidal shape.

According to a further exemplary embodiment, the sealing ring holder consists of a plastics or a metal and is preferably able to be produced by an injection-molding method, a 3D-printing method or a casting method. The valve housing in this case may consist of a plastics or a metal, such as for example aluminum or an aluminum alloy. As a result, the sealing ring holder may be produced in a flexible manner by a plurality of production methods. A sealing ring holder produced by an injection-molding method, for example, may be produced in a manner which is particularly simple in terms of technology and which is cost-efficient.

According to a further embodiment, the sealing ring holder has at least two through-openings for connecting to the fluid ducts, wherein in each case a sealing ring and an O-ring are able to be inserted into the through-openings. The through-openings are preferably configured such that these through-openings face in the direction of the fluid ducts which open into the accommodation space of the valve housing. In particular, the fluid ducts may open into the through-openings. In this case, the O-rings may seal the sealing rings and also the fluid ducts relative to the accommodation space of the valve housing.

According to a further exemplary embodiment, the sealing ring and the O-ring are able to be inserted by a positive connection, a frictional connection or a non-positive connection into the through-openings of the sealing ring holder. By this measure the sealing ring holder may be assembled with the inserted valve means, the sealing rings and the O-rings as a combined component, wherein this combined component may be inserted through the opening into the accommodation space of the valve housing in one production step. By means of this production step all of the sealing effects between the walls of the accommodation space and the O-rings, as well as between the sealing rings and the valve means, are formed at the same time. The valve may be completed by subsequently closing the opening.

According to a further embodiment, the valve means is able to be connected in an anti-rotational manner via a shaft receiver to a shaft via the opening of the valve housing. To this end, the shaft receiver may have a shape or a recess or bulge which may be connected by a positive connection to a shaft portion on the end side. By means of such a connection the shaft may reliably rotate the valve means and thus control and regulate a fluid flow between the fluid ducts. The shaft may preferably be driven by an electric motor or an actuator for adjusting a rotational position of the valve means.

According to a further exemplary embodiment, the valve means has a flattened portion on a side opposing the shaft receiver. Preferably, the flattened portion of the valve means may be oriented toward a bottom of the accommodation space. The bottom of the accommodation space is located on a side of the accommodation space opposing the opening and is shaped in a substantially planar manner. As a result, the valve means may bear against the bottom, whereby an inadvertent tilting or twisting of the valve means in the accommodation space is prevented. By this measure a correct orientation of the shaft receiver relative to the opening of the valve housing may be ensured.

According to a further aspect of the invention, a sealing ring holder is provided for receiving a valve means. The sealing ring holder is designed for use in a valve according to the invention.

Preferably, the sealing ring holder is designed in a box-shaped or grid-shaped manner, whereby a receiving region is formed on the inside, the valve means being able to be pressed or inserted therein. The sealing ring holder may preferably receive and position sealing rings and O-rings relative to the valve means, whereby the sealing ring holder is configured as a universal receiving unit and positioning unit. By the use of such a sealing ring holder, the production of a valve may be carried out in a particularly rapid and cost-efficient manner.

BRIEF DESCRIPTION OF THE DRAWINGS

Preferred exemplary embodiments of the invention are described in more detail hereinafter with reference to highly simplified schematic views. In the drawings.

DETAILED DESCRIPTION

Figure 1:
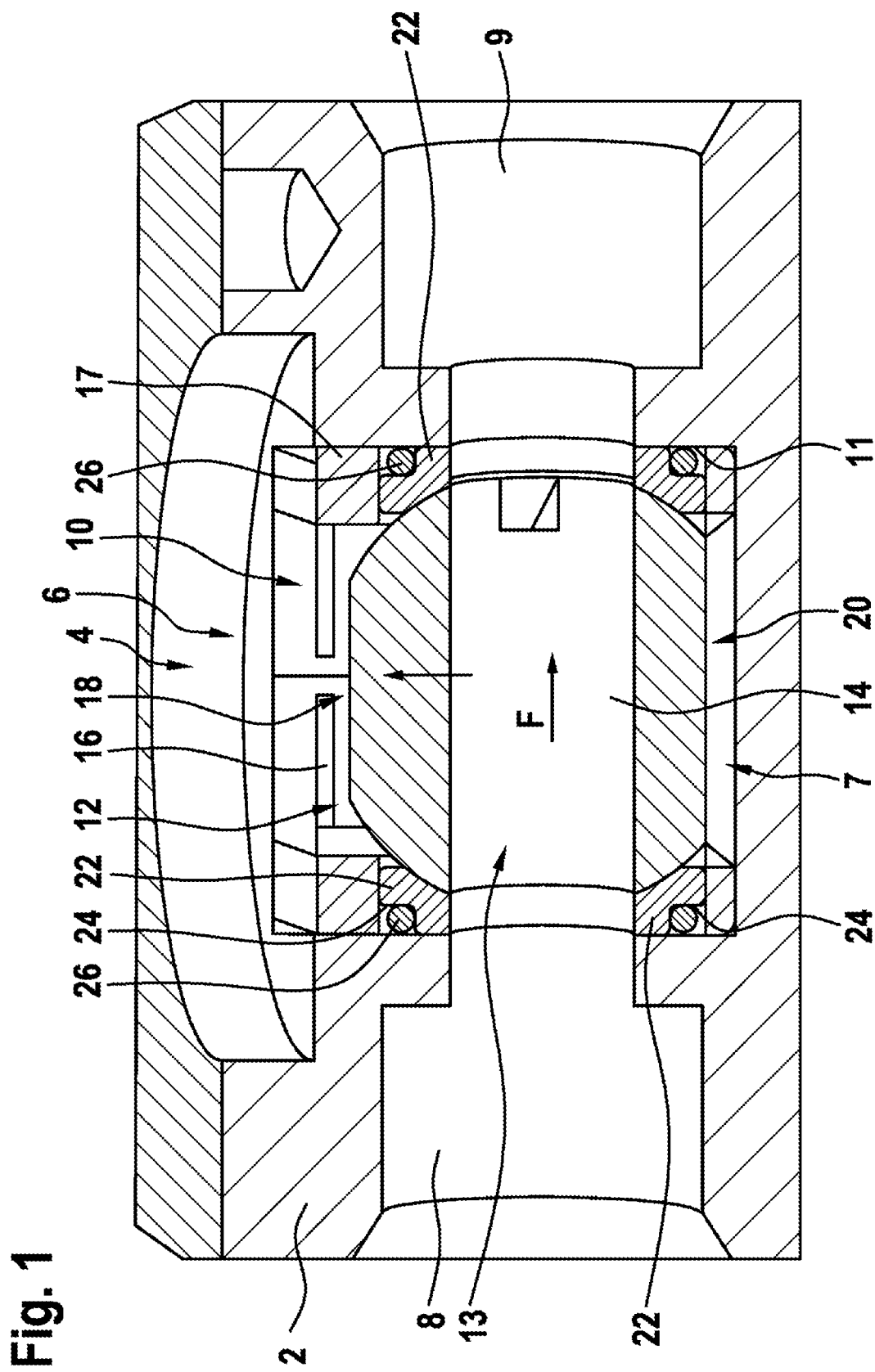
FIG. 1 shows a sectional view through a valve according to one embodiment.

In FIG. 1 a sectional view through a valve 1 according to one embodiment is shown. The valve 1 is designed as an expansion valve and has a valve housing 2 which consists of an aluminum alloy.

An opening 4 which opens into a substantially cuboidal accommodation space 6 is incorporated in the valve housing 2. Moreover, two fluid ducts 8, 9 are configured in the valve housing 2. The fluid ducts 8, 9 are cylindrically shaped and open into the accommodation space 6. The fluid ducts 8, 9 extend by way of example perpendicularly to the opening 4. The fluid ducts 8, 9 are arranged such that a fluid flow F is conducted from a first fluid duct 8 via the accommodation space 6 into a second fluid duct 9.

According to a development of the invention, at least one of the fluid ducts 8, 9 may also extend transversely or parallel or slightly obliquely to the opening 4. In particular, at least one of the fluid ducts may extend at a flat or acute angle to the opening 4. Preferably, an angle of between 45 and 135 degrees, preferably of between 80 and 100 degrees, for example between 85 and 95 degrees, is formed between the fluid ducts and the opening 4.

A sealing ring holder 10 is arranged in the accommodation space 6. The sealing ring holder 10 has a shape which corresponds to a shape of the accommodation space 6.

A valve means 14 is positioned in an internal receiving region 12 of the sealing ring holder 10. The sealing ring holder 10 in this case consists of two parts 16, 17 which encompass the valve means 14.

The valve means 14 is of substantially spherical design and has a shaft receiver 18 in the region of the opening 4 and a flattened portion 20 on a side opposing the opening 4. By means of the flattened portion 20 the valve means 14 may bear against a bottom 7 of the accommodation space 6 and may be secured against tilting or twisting. Alternatively, this function may be undertaken by two sealing rings 22.

The valve means 14 has a connecting channel 13. The connecting channel 13 may be used to connect the fluid ducts 8, 9 together in a fluid-conducting manner. Preferably, the connecting channel 13 extends perpendicularly to an opening direction of the opening 4 through the valve means 14.

According to a development, the connecting channel 13 has a transverse extension relative to an opening direction of the opening 4 through the valve means 14. In particular, the angle between the opening direction and the longitudinal extension of the connecting channel is configured to be between 45 and 135 degrees, preferably between 80 and 100 degrees.

The fluid ducts 8, 9 run through the sealing rings 22 and through the valve housing 2 and open directly onto the valve means 14.

The sealing rings 22 are introduced into through-openings 11 of the sealing ring holder 10 and form with the through-openings 11 receiving grooves 24 for O-rings 26.

In a state arranged in the accommodation space 6, the O-rings 26 are pressed by the valve means 14 and the sealing rings 22 against walls 28 of the accommodation space 6. As a result, it is possible to configure a seal which acts axially in the direction of the fluid flow F.

The valve means 14, the sealing rings 22 and the O-rings 26 are held together by the sealing ring holder 10 and thus may be pushed in one step through the opening 4 into the accommodation space 6 of the valve housing 2.

Figure 2:
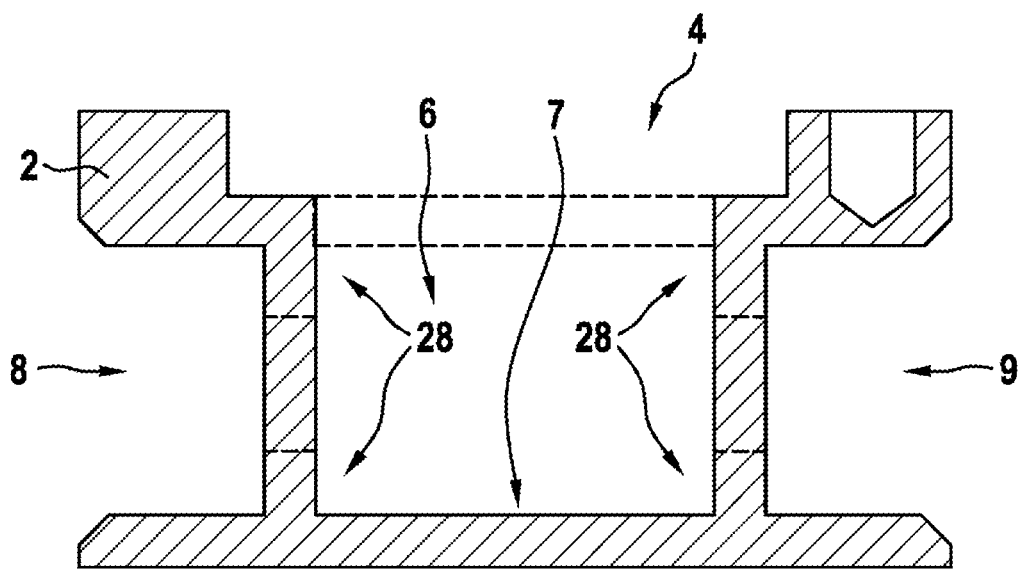
FIG. 2 shows a sectional view through a valve housing of FIG. 1.

FIG. 2 illustrates in a sectional view the construction of the valve housing 2 for a valve of FIG. 1. In this case, in particular, the accommodation space 6 is illustrated with a rectangular cross section or with a rectangular bottom surface. The opening 4 of the valve housing 2 has dimensions which correspond to the dimensions of the accommodation space 6 and thus also of the sealing ring holder 10, or which exceed these dimensions.

The accommodation space 6 is laterally defined by walls 28. These walls 28 serve at the same time as sealing surfaces for the O-rings 26.

Figure 3:
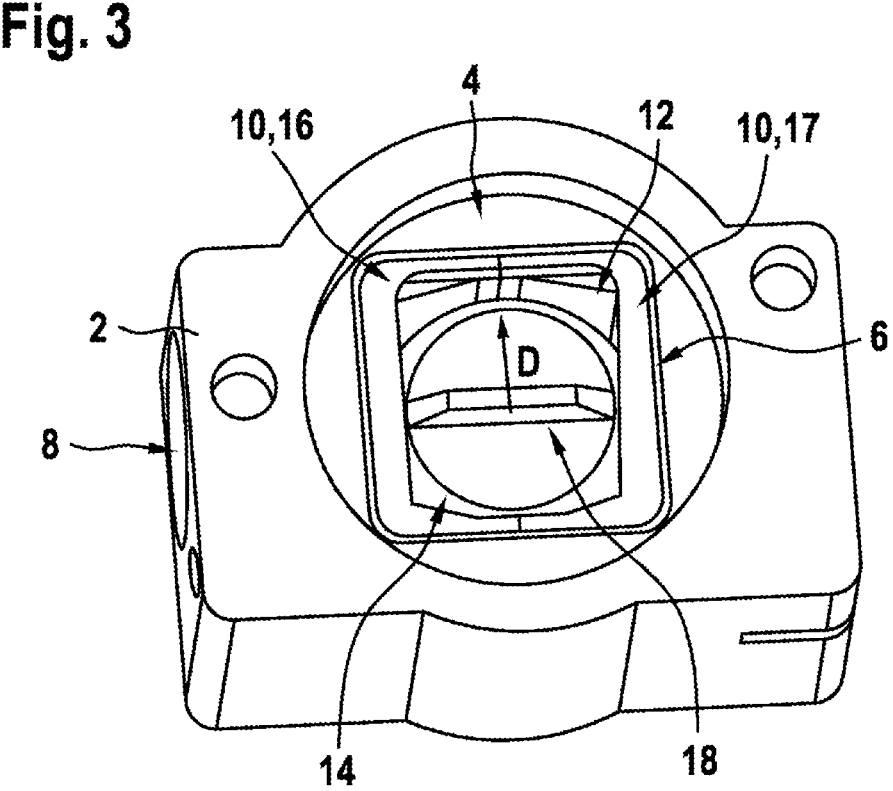
FIG. 3 shows a perspective view of an opening of the valve of FIG. 1.

In FIG. 3 a perspective view of an opening 4 of the valve 1 of FIG. 1 is shown. The cuboidal sealing ring holder 10 which is arranged in the accommodation space 6 is illustrated. The sealing ring holder 10 is inserted positively in the accommodation space 6. The valve means 14 is positioned in the receiving region 12 on the inside of the sealing ring holder 10. The valve means 14 may be rotated through the opening 4 of the valve housing 2 on the shaft receiver 18 along the rotational axis D in order to achieve a control of the fluid flow F.

Figure 4:
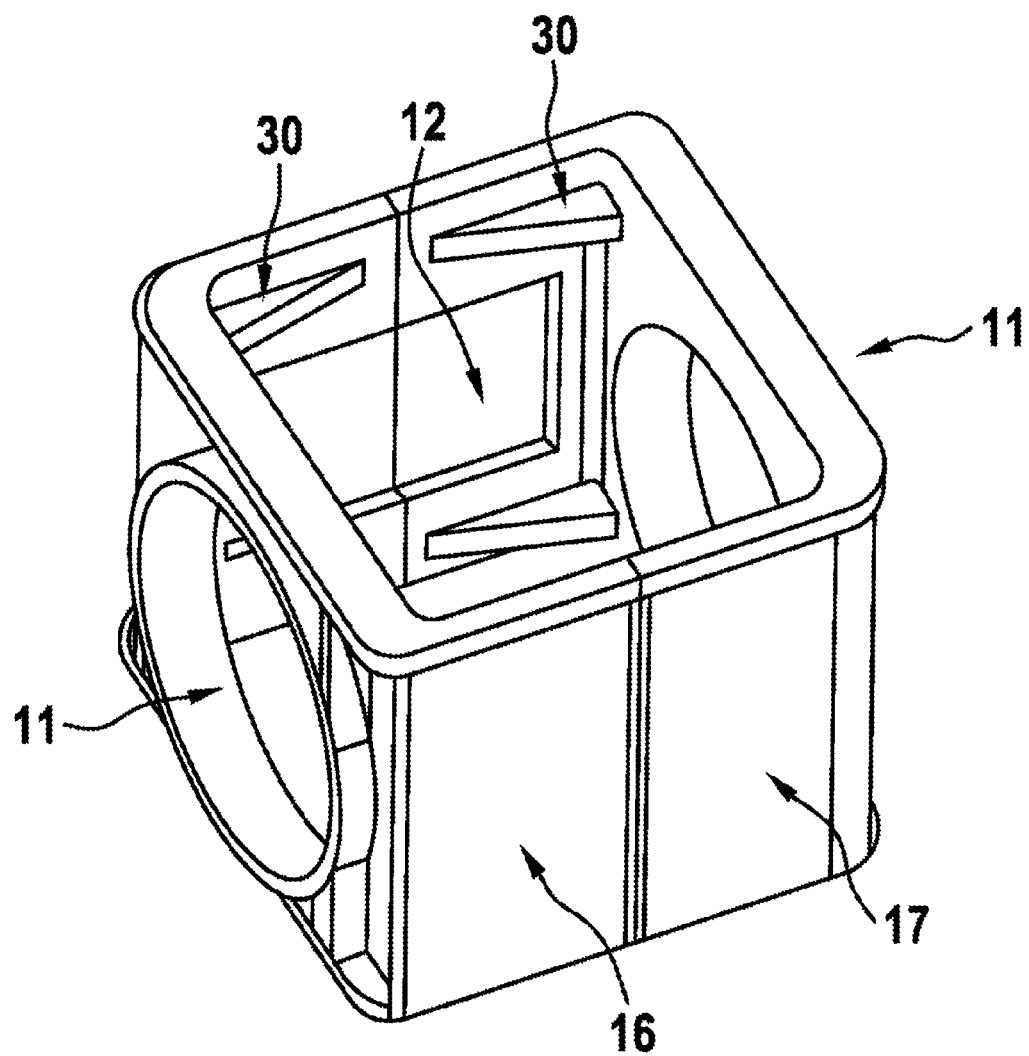
FIG. 4 shows a perspective view of a sealing ring holder according to one embodiment.

FIG. 4 shows a perspective view of the sealing ring holder 10 according to one embodiment. The sealing ring holder 10 is designed in two parts and consists of two equal-sized parts 16, 17 which together encompass a receiving region 12.

Each part 16, 17 has a through-opening 11 into which a sealing ring 22 and an O-ring 26 may be inserted. The through-openings 11 thus permit a sealed transition between the fluid ducts 8, 9 and the connecting channel 13 of the valve means 14.

The parts 16, 17 of the sealing ring holder 10 may be produced by an injection-molding method and have reinforcing ribs 30 in order to increase a mechanical stability.

"Slightly obliquely" is to be understood to mean that an angle of, in particular, up to 20 degrees, preferably up to 5 degrees, for example up to 3 degrees, is formed. Preferably, the angle is the deviation relative to a perpendicular configuration. In particular, the angle with a slightly oblique configuration between at least one fluid duct 8, 9 and the opening 4 is, in particular, between 70 and 110 degrees, preferably between 85 and 95 degrees, for example between 87 and 93 degrees.

What is claimed is:

1. A valve (1) for controlling a fluid flow (F), the valve (1) having a valve housing (2) with an accommodation space (6) and at least two fluid ducts (8, 9) connected to the accommodation space (6), the valve housing (2) having an opening (4) which opens into the accommodation space (6), wherein a sealing ring holder (10) with a valve means (14) is situated in the accommodation space (6), wherein the sealing ring holder (10) with the valve means (14) held therein is configured to be inserted into the accommodation space (6) through the opening (4), and wherein the valve means (14) is positioned rotatably in the sealing ring holder (10) by at least a first and a second sealing ring (22), wherein the sealing ring holder (10) includes a first part (16) and a second part (17) positioned on opposite sides of the valve means (14), wherein the first part (16) retains the first sealing ring (22) positioned between the valve means (14) and the valve housing (2), the first sealing ring (22) receiving a first O-ring (26) between the first sealing ring (22), the valve housing (2), and the first part (16), and wherein the second part (17) retains the second sealing ring (22) positioned between the valve means (14) and the valve housing (2), the second sealing ring (22) receiving a second O-ring (26) between the second sealing ring (22), the valve housing (2), and the second part (17).

2. The valve as claimed in claim 1, wherein the first and second parts (16, 17) are connected by an adhesive connection, a welded connection, or by a positive interaction of the two parts with walls (28) of the accommodation space (6) for positioning the valve means (14).

3. The valve as claimed in claim 1, wherein the sealing ring holder (10) has a cuboidal shape and is configured as a receiving cage for the valve means (14).

4. The valve as claimed in claim 1, wherein the sealing ring holder (10) includes a plastic or a metal and is configured to be produced by an injection-molding method, a 3D-printing method or a casting method.

5. The valve as claimed in claim 1, wherein the sealing ring holder (10) has at least two through-openings (11) for connecting to the fluid ducts (8, 9), wherein the first and second sealing rings (22) and the first and second O-rings (26) are configured to be inserted into the through-openings (11).

6. The valve as claimed in claim 5, wherein the first and second sealing rings (22) and the first and second O-rings (26) are configured to be inserted by a positive connection or a frictional connection into the through-openings (11) of the sealing ring holder (10).

7. The valve as claimed in claim 1, wherein the valve means (14) is configured to be connected in an anti-rotational manner via a shaft receiver (18) to a shaft via the opening (4) of the valve housing (2).

8. The valve as claimed in claim 7, wherein the valve means (14) has a flattened portion (20) on a side opposing the shaft receiver (18).

9. The valve as claimed in claim 1, wherein the valve (1) is an expansion valve.

10. The valve as claimed in claim 9, wherein the opening (4) runs perpendicularly to the fluid ducts (8, 9).

11. A sealing ring holder (10) for receiving a valve means (14), wherein the sealing ring holder (10) is configured for use in a valve (1) for controlling a fluid flow (F), the valve (1) having a valve housing (2) with an accommodation space (6) and at least two fluid ducts (8, 9) connected to the accommodation space (6), the valve housing (2) having an opening (4) which opens into the accommodation space (6), wherein the sealing ring holder (10) with the valve means (14) is configured to be situated in the accommodation space (6), wherein the sealing ring holder (10) with the valve means (14) held therein is configured to be inserted into the accommodation space (6) through the opening (4), and wherein sealing ring holder (10) is configured to have the valve means (14) positioned rotatably in the sealing ring holder (10) by at least a first and a second sealing ring (22), wherein the sealing ring holder (10) includes a first part (16) and a second part (17) positioned on opposite sides of the valve means (14), wherein the first part (16) retains the first sealing ring (22) positioned between the valve means (14) and the valve housing (2), the first sealing ring (22) receiving a first O-ring (26) between the first sealing ring (22), the valve housing (2), and the first part (16), and wherein the second part (17) retains the second sealing ring (22) positioned between the valve means (14) and the valve housing (2), the second sealing ring (22) receiving a second O-ring (26) between the second sealing ring (22), the valve housing (2), and the second part (17).

12. The sealing ring holder as claimed in claim 11, wherein the first and second parts (16, 17) are connected by an adhesive connection, a welded connection, or by a positive interaction of the two parts with walls (28) of the accommodation space (6) for positioning the valve means (14).

13. The sealing ring holder as claimed in claim 11, wherein the sealing ring holder (10) has a cuboidal shape and is configured as a receiving cage for the valve means (14).

14. The sealing ring holder as claimed in claim 11, wherein the sealing ring holder (10) includes a plastic or a metal and is configured to be produced by an injection-molding method, a 3D-printing method or a casting method.

15. The sealing ring holder as claimed in claim 11, wherein the sealing ring holder (10) has at least two through-openings (11) for connecting to the fluid ducts (8, 9), wherein the first and second sealing rings (22) and the first and second O-rings (26) are configured to be inserted into the through-openings (11).

16. The sealing ring holder as claimed in claim 15, wherein the first and second sealing rings (22) and the first and second O-rings (26) are configured to be inserted by a positive connection or a frictional connection into the through-openings (11) of the sealing ring holder (10).

* * * * *